E. H. BRISTOL.
CONTROL SYSTEM.
APPLICATION FILED NOV. 23, 1914.

1,405,181.

Patented Jan. 31, 1922.
4 SHEETS—SHEET 2.

Witnesses:
Carl L. Choate.
Horace A. Crossman

Inventor:
Edgar H. Bristol,
by Emery, Booth, Janney & Varney
Attys.

E. H. BRISTOL.
CONTROL SYSTEM.
APPLICATION FILED NOV. 23, 1914.
1,405,181.
Patented Jan. 31, 1922.
4 SHEETS—SHEET 3.
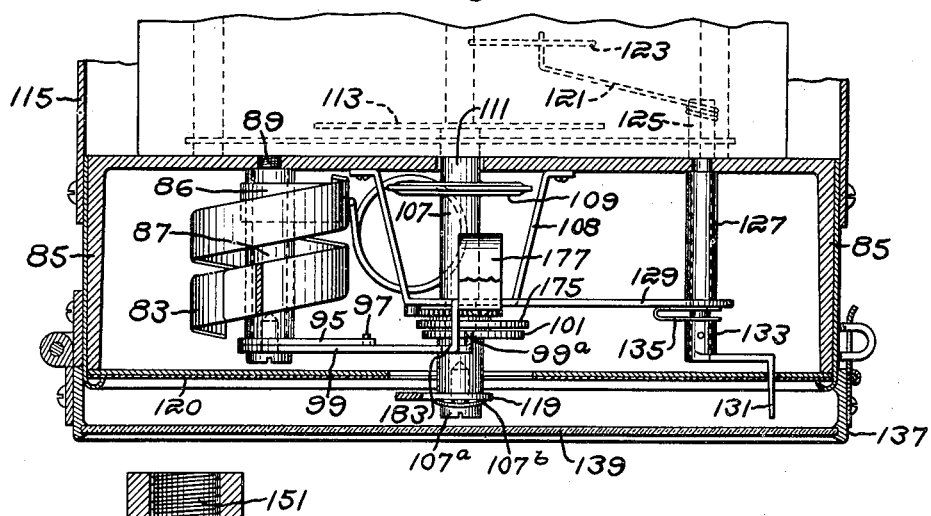
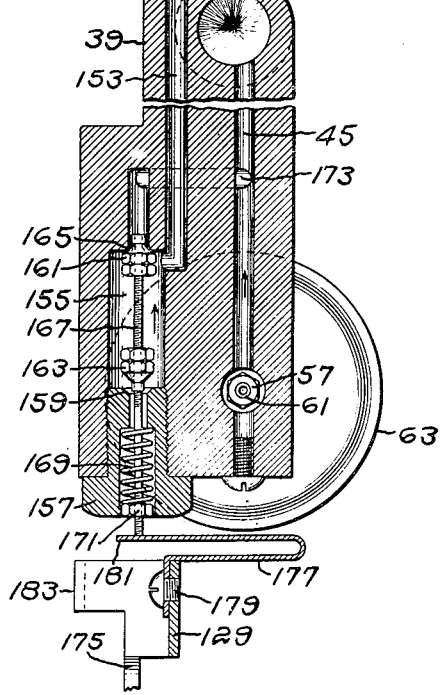
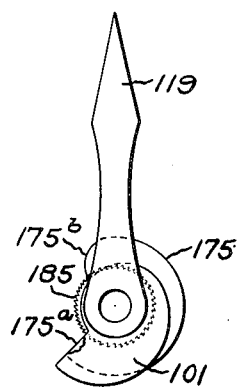
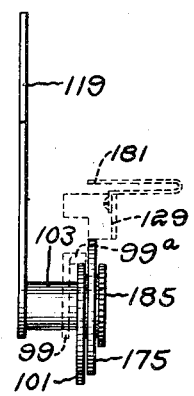
Witnesses:
Carl L. Choate.
Horace A. Crossman
Inventor:
Edgar H. Bristol,
by Emery, Booth, Janney & Varney
Attys.

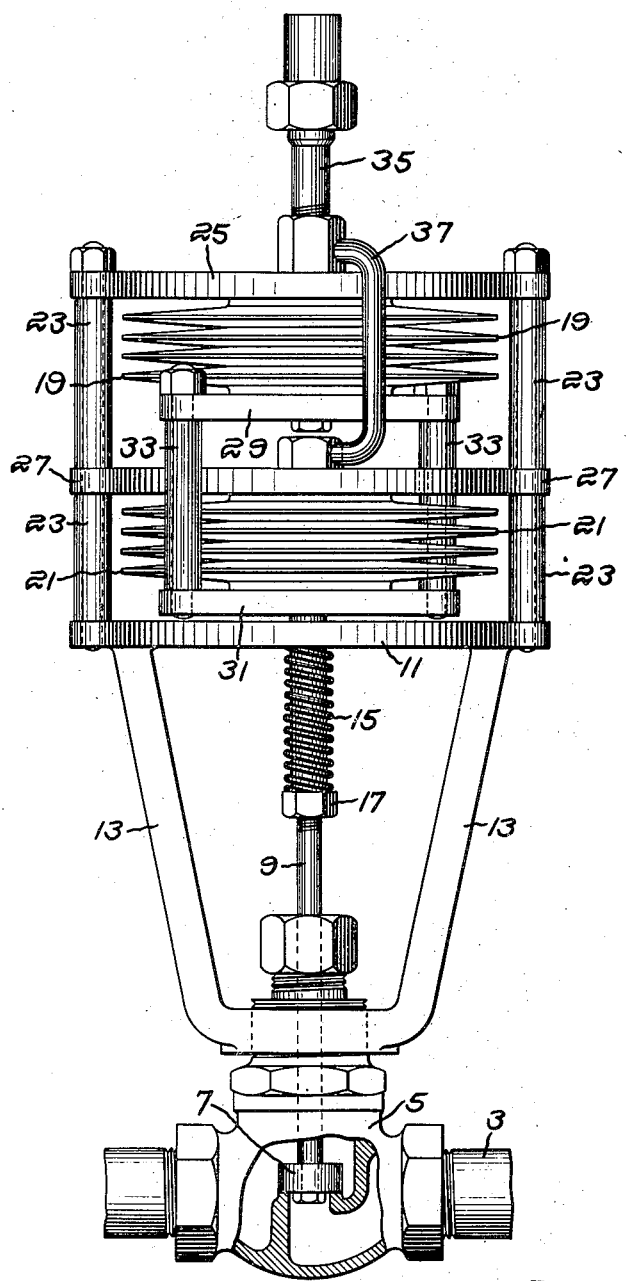

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

CONTROL SYSTEM.

1,405,181.  Specification of Letters Patent.  Patented Jan. 31, 1922.

Application filed November 23, 1914. Serial No. 873,573.

*To all whom it may concern:*

Be it known that I, EDGAR H. BRISTOL, a citizen of the United States, and a resident of Foxboro, Massachusetts, have invented an Improvement in Control Systems, of which the following description, in connection with the accompanying drawings, is a specification, like characters on the drawings representing like parts.

This invention relates to, automatic controlling apparatus for producing predetermined conditions of temperature, pressure and for other purposes. The field of use of the apparatus is very extensive but to facilitate the understanding thereof it is described as applied for maintaining a predetermined temperature in a vat.

The character of the invention may be best understood by reference to the following description of an illustrative embodiment thereof shown in the accompanying drawings, wherein:

Fig. 1 is a front elevation of an illustrative apparatus shown herein as embodying the invention;

Fig. 2 on an enlarged scale is a front elevation of a casing shown in Fig. 1 with the dial plate removed to disclose the mechanism back of the same;

Fig. 3 on an enlarged scale is a view partly in side elevation and partly in vertical section of devices shown in Fig. 2;

Fig. 4 is a horizontal section taken on line 4—4 of Fig. 2;

Figs. 6 and 7 are front and side elevations of an index hand and cams associated therewith; and Fig. 8 on an enlarged scale is a view partly in side elevation and partly in section of a diaphragm mechanism for controlling a valve employed in the apparatus shown in Fig. 1.

Figure 1:
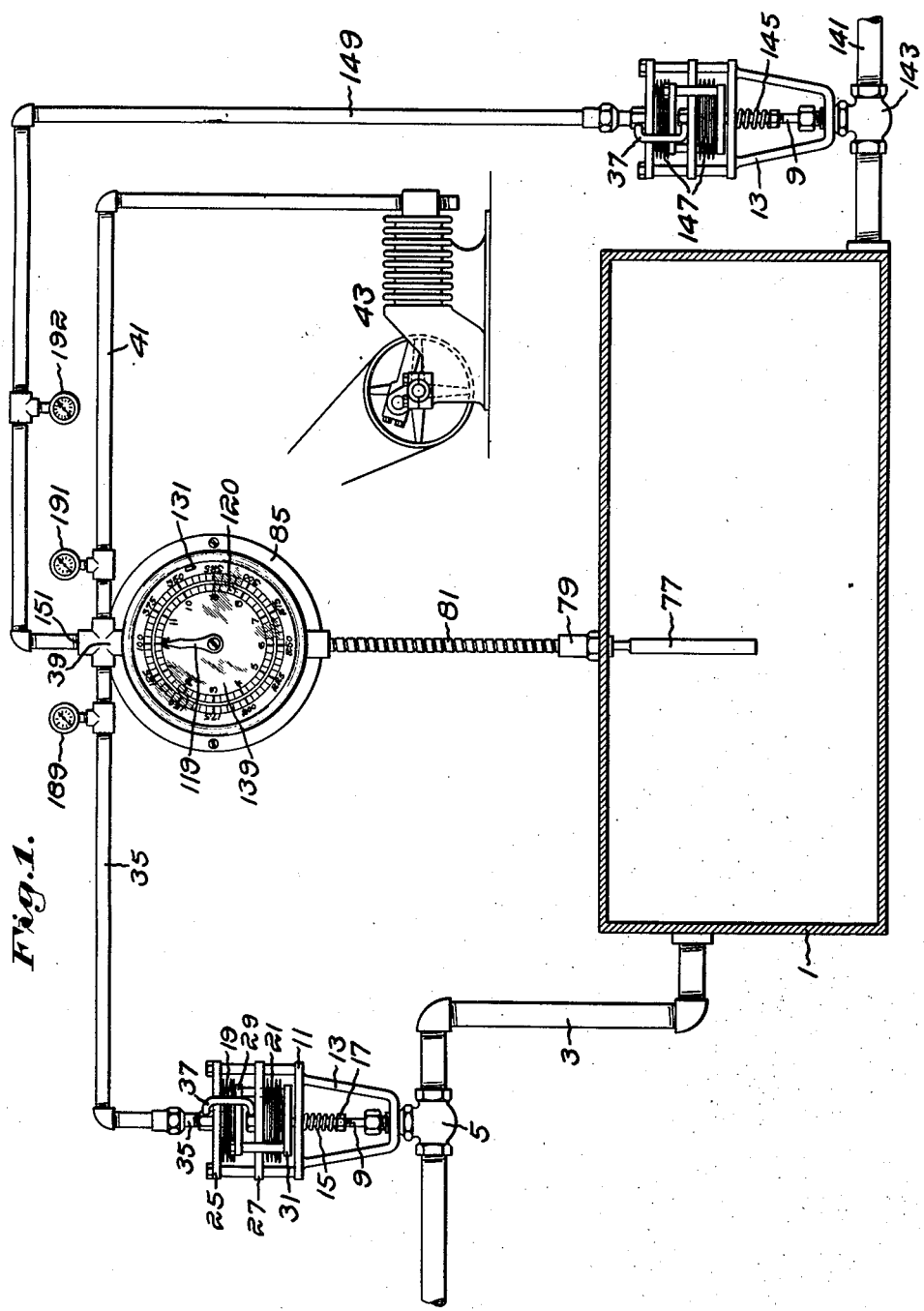

Referring to Fig. 1 of the drawings, 1 designates a vat adapted to be heated by steam for any purpose desired. The steam is supplied through a pipe 3 leading from a boiler unnecessary to be shown herein.

To regulate the supply of steam to the vat a union 5 is interposed in the pipe 3 and contains a valve 7 (Fig. 8). To open and close this valve it is provided with a stem 9 projecting upward through a disk-like plate 11 mounted on a frame 13 projecting upward from said union. The valve is normally urged toward its seat by a helical spring 15 encircling said stem and confined between the lower face of said disk plate and a nut 17 on said stem.

To open the valve there are provided pressure responsive expansion tubes 19 and 21, each comprising a series of expansible sections or diaphragms adapted to be elongated or contracted by variation of pressure. While two of these tubes are shown herein one or more may be used according to the power required. To support these tubes the disk plate 11 referred to is provided with diametrically opposed posts 23 projecting upward therefrom and carrying an upper disk-like spider 25 and an intermediate spider 27 located substantially midway between the disk plate and the upper spider. The upper tube is fast to and depends from the lower face of the upper spider and the lower tube is fast to and depends from the lower face of the intermediate spider. The lower ends of the tubes are secured to bars 29 and 31 projecting somewhat beyond the sides of the tubes and connected by posts 33. The lower bar 31 is made fast to the valve stem referred to. By connecting the tubes as described their combined power will be effective to control the valve as more fully hereinafter described.

The tubes are adapted to be contracted by creating more or less of a vacuum therein. For this purpose the upper tube communicates with a pipe 35 projecting upwardly therefrom, said pipe being connected to the lower tube by a U-shaped branch pipe 37 extending around and beneath the upper tube. The pipe 35 is connected by a union 39 with a pipe 41 connected in turn with a vacuum pump 43. This pump may be of any usual construction and therefore it is not necessary to describe the same in detail herein. When the vacuum pump is operated it will create a vacuum tendency in the pipe and also in the expansion tubes. As a result the tubes will collapse and operate against the resistance of the helical spring 15 and lift the valve up off from its seat. This will permit steam to pass from the boiler through the pipe 3 to the vat and raise the temperature therein.

Next will be described mechanism for automatically rendering the vacuum effective or ineffective for operating the expansion tubes to open and close the valve. To accomplish this the union 39 (Figs. 2 and 3) is provided with a duct 45 communicating with the vacuum pipe 41 and a duct 47 communicating with the valve controlling pipe 35. The two ducts are connected by a transverse port 49 formed to present valve seats 51 and 53. One end of the port communicates with the outside atmosphere and the other end may be closed by a plug 55 threaded therein. The seat 51 has a valve 57 and the seat 53 has a valve 59, both of said valves being mounted on a small tube 61 of brass or other appropriate material. When the tube is moved to the right it will close the valve 59 and shut off the port 49 from the outside atmosphere and open the valve 57 permitting communication from the vacuum pump through the pipe 41, duct 45, port 49, duct 47 and pipe 35 to the expansion tubes, thereby permitting the latter to contract and open the valve 7 in the steam pipe. If, however, the tube 61 is moved to the left it will close the valve 57 and shut off communication between the vacuum pump and the expansion tubes and open the valve 59 and open the port 49 and duct 47 to the atmosphere, thereby destroying the vacuum in the expansion tubes. This will release the spring 15 which will operate to close the valve 7 and shut off the steam supply to the vat.

To automatically shift the valve carrying tube 61 it is extended beyond the port and connected to one end of an expansible diaphragm 63, the other end of which is fast on a hub 65 threaded on a screw 67, threaded in turn into a hole in an L-shaped arm 69 projecting from the union 39. This screw terminates in a conical head 71 provided with a very minute passage 73 extending from the point of the head to and communicating with the hub on said screw. This conical head presents a valve seat 74 for cooperation with a valve, as more fully hereinafter described. The valve carrying tube referred to has an end communicating with the portion of the port between the valve 57 and the plug 55. Consequently said port is normally open to the atmosphere through said tube, diaphragm and the minute passage in the conical valve seat. When the valve 59 is closed shutting off the port 49 from the atmosphere there is a slight seepage of air into the port through the minute passage in the cone valve seat, but the loss of vacuum had therethrough is so small that it does not interfere with the maintaining of a sufficient vacuum in the expansion tubes to collapse the same. The diaphragm 63 is so constructed that the inherent resilience thereof tends to keep the valve tube 61 drawn to the right sufficiently to open the valve 57 and close the valve 59. If, however, the passage through the cone valve seat is closed there will be a partial vacuum created within the expansion tube 63 which will collapse the same somewhat and move the valve tube 61 to the left, thereby closing the valve 57 and shutting off the vacuum pump 43 from the expansion tubes 19 and 21 and opening the valve 59, thereby admitting air to the expansion tubes and releasing the spring 15 and permitting the same to close the valve 7, shutting off the supply of steam to the vat and permitting the temperature therein to fall.

If the passage in the cone valve seat be open the diaphragm 63 will be open to the atmosphere and will expand by virtue of its inherent resilience and shift the valve tube 61 to the right, closing the valve 59 and opening the valve 57, thereby permitting communication between the vacuum pump and expansion tubes, causing the latter to contract and again open the steam valve 7, thereby permitting the ingress of steam to the vat and raising the temperature therein.

Figure 2:
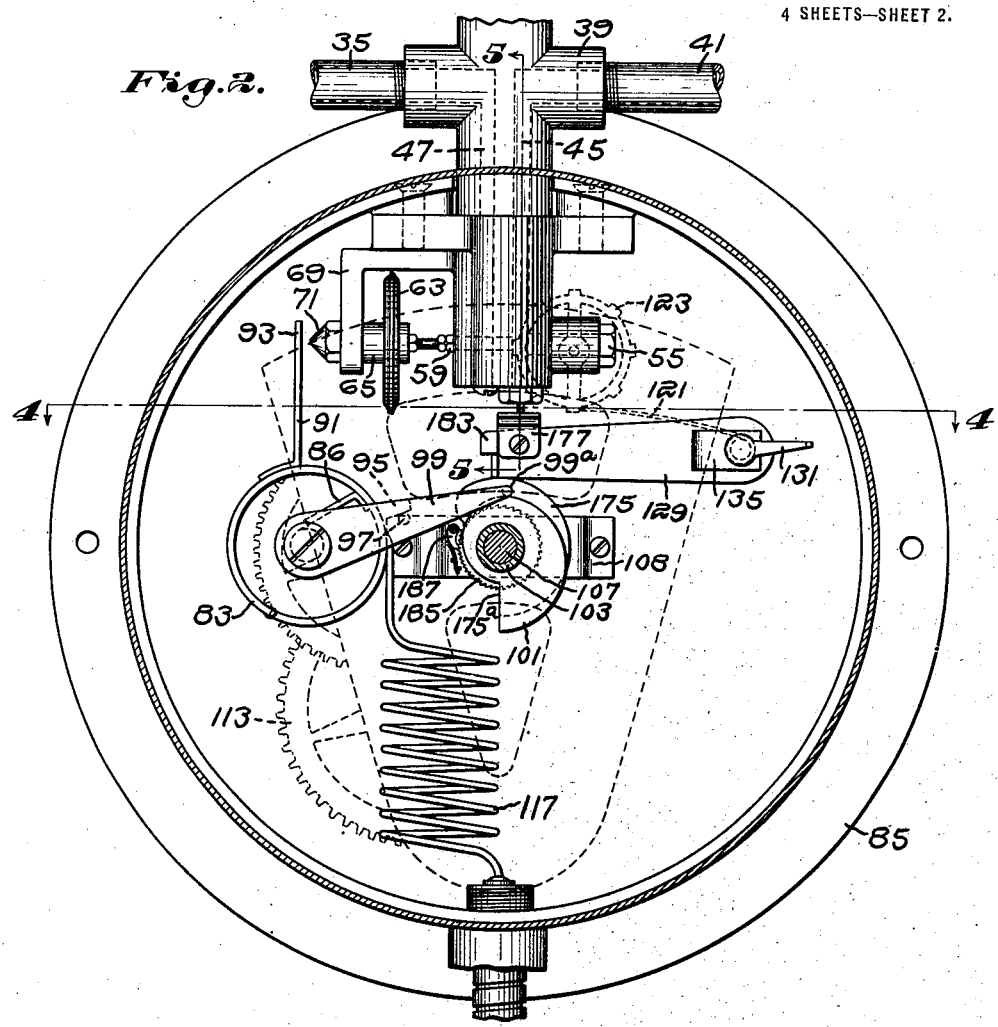

Next will be described means for automatically opening and closing the passage in the cone valve seat as described. To accomplish this a thermometer 77 (Fig. 1) typified herein as a copper tube fast to a plug 79 is connected by a small gage flexible pipe 81 with a helical expansion tube 83 (Figs. 2 and 4). This tube and the union containing the valve mechanism described may be enclosed in a cylindrical casing 85. The tube is mounted on an arm 86 fast on a sleeve 87 journaled on a stud shaft 89 projecting outward from and fast on the rear wall of the casing. This sleeve is normally stationary, but may be turned into different positions of adjustment as hereinafter described. The upper end portion of the helical tube is provided with a flat, ribbon-like strip 91 projecting therefrom toward and having its end opposed to the conical valve seat 74 referred to. This strip constitutes a valve 93 for opening and closing the passage in the conical valve seat 74.

The thermometer, small gage pipe and pressure responsive helical tube contain alcohol or other appropriate fluid. As the temperature of the thermometer rises this liquid expands and causes the helical expansion tube to tend to uncoil or straighten, thereby producing a rotative effect which moves the valve 93 toward the conical valve seat and if the pressure is sufficient it will cause the same to engage said seat and shut off the ingress of air through the minute passage therein. When the temperature of the thermometer lowers, the pressure in the helical tube will be reduced and the helical coil will contract and rotate in the opposite direction and cause the valve to move away from the conical valve seat and again permit the ingress of atmospheric air therein.

By adjusting or turning the sleeve 87 carrying the helical pressure responsive coil the valve 93 may be positioned at various predetermined distances from the valve seat and thereby make it necessary for the same to move through greater or less distances before becoming effective to close said valve as desired. To set the helical coil in such positions the sleeve carrying the same is provided with an arm 95 (Fig. 2) fast thereon having a notched end adapted to engage a pin 97 on a follower arm 99 loose on the shaft 89 and contacting with a spiral cam 101 fast on a sleeve shaft 103 fitting on the reduced end of a solid shaft 107 journaled in a bearing bracket 108 mounted on the rear wall of the casing. To frictionally connect the sleeve shaft with the solid shaft a screw 107ª is tapped into the reduced end of the solid shaft and a dished spring washer 107ᵇ is interposed between the head of the screw and an index fast on the outer end of the sleeve shaft. The inner end of the solid shaft is fast on one head of a diaphragm 109 (Fig. 4) the opposite head of which is fast to a shaft 111 adapted to be driven by a usual time train 113 diagrammatically shown in a casing 115 secured to the rear of the casing 85 referred to. The diaphragm 109 provides a flexible transmission from the time train driven shaft 111 to the shaft 107 and permits the latter and the sleeve shaft 103 thereon to rotate on a true axis regardless of the non-alignment of the time train driven shaft therewith.

The arms 95 and 99 are urged toward the cam 101 by appropriate means typified herein as a spring formed by a series of turns or coils 117 in the small gage pipe leading from the thermometer to the helical responsive tube. The outer end of the cam shaft 103 may be provided with an index hand 119 (Figs. 6 and 7) adapted to move over a dial graduated and marked on a plate 120 (Figs. 1 and 4) to indicate different pressures or other conditions as desired. This plate is appropriately secured within the casing and is centrally apertured to permit the shafts 103 and 107 to project therethrough.

The index 119 may also serve as a handle by which the shaft may be turned and set into predetermined positions. If for example it is desired to maintain in the vat a predetermined temperature of 125°, the hand is turned to indicate 125° on the dial. In the course of this movement the hand will turn the shaft 103 and the cam 101 thereon. The cam will rock the arm 99 and through the pin 97 the arm 95, thereby turning the shaft 87 and helix tube to position the valve 93 at a distance from the valve seat 74 appropriate for causing said valve to close the end of the tube 61 when the thermometer reaches the temperature of 125°. On the occurrence of this event, the vacuum condition in the port 49 becomes effective to collapse the diaphragm 63 and open the atmosphere valve 59 and close the valve 57. This releases the vacuum from the expansion tubes and permits the spring 15 to close the valve in the steam pipe.

When the temperature falls below 125° the helix tube will contract and move the valve 93 away from the conical valve seat 74 permitting the ingress of air through the passage 73 to the diaphragm 63, and allowing the latter to expand and close the atmosphere valve 59 and open the valve 57, thereby again placing the expansion tubes under vacuum and opening the steam valve. As a result steam will again be admitted to the vat and the temperature therein will rise. By the automatic moving of the valve 93 toward and from its seat 74 as described the temperature of 125° is maintained in the vat.

In some instances it may be desirable to progressively gradually vary the temperature. To accomplish this the cam shaft 103 may be driven by the time train described. By this arrangement the cam will be slowly rotated and act through the arms 99 and 95 and helical tube to vary the distance of the valve 93 from the conical valve seat and gradually increase or decrease the temperature.

If it is desired to set the valve 93 a fixed distance from its valve seat 74 to maintain a predetermined temperature the time train should be arrested in order that the cam shaft 103 will not rotate and vary the position of the helix tube carrying said valve 93. To permit the starting and the stopping of the time train there is provided an arm 121 (Figs. 2 and 4) conveniently of resilient wire adapted to be moved into the path of oscillation of the balance wheel 123 of the time train. The arm 121 is made fast to the end of a shaft 125 journaled in a standard 127 fast on the rear wall of the casing 85. This standard carries an arm 129 projecting toward the cam shaft 103 for a purpose to be described. To rock the shaft 125 a handle 131 is provided having a hub 133 fast on the end of said shaft. A U-shaped spring 135 is interposed between the end of said hub and the arm 129 in order to frictionally hold the shaft 125 in its different positions of adjustment. By giving the handle a slight turn the shaft 125 will also turn and swing the arm 121 out of the path of the balance wheel 123, thereby permitting the time train to operate and impart a gradual rotative movement to the cam shaft 103 and the cam 101 thereon. When it is desired to hold the cam stationary the handle 131 is rocked slightly to swing the arm 121 back into the path of the balance wheel 123, thereby arresting the oscillation of the latter and stopping the time train.

The dial plate 120 may also be marked with graduations and numerals for indicating time. The index hand 119 may perform the dual function of indicating time and temperatures or other conditions as desired. The time train controlling handle 131 may project through an aperture in the dial plate where it will be conveniently accessible for operation. To protect the dial a cover 137 is provided hinged to the casing 85 and provided with a glass 139 for disclosing the dial.

The cam 101 is shown herein for purposes of illustration as spiral in shape with an abrupt shoulder. This when driven by the time train will operate to increase the temperature at a uniform rate until a predetermined degree is attained when the follower arm 99 will drop from the point of longest radius of the cam toward the axis thereof, thereby permitting the temperature to fall.

If the steam in the vat were permitted to remain therein the temperature thereof would fall at a low rate. In some cases it is desirable to exhaust the steam from the vat in order that the temperature may fall rapidly. To accomplish this an exhaust pipe 141 (Fig. 1) is connected to the vat conveniently adjacent the bottom thereof and is provided with a union 143 containing a valve similar to the steam inlet valve 7 described. This valve is normally closed by a spring 145 and may be opened by expansion tubes 147 similar to those described for operating the steam inlet valve 7.

An important feature of the invention relates to mechanism for automatically opening and closing the exhaust valve at the time desired. To accomplish this the expansion tubes 147 are connected by a pipe 149 with the union 39 referred to, said pipe being tapped into a threaded bore 151 (Fig. 5) in said union. This bore communicates through a duct 153 in said union with a chamber 155 having a plug 157 threaded therein having a bore therethrough and its inner end formed to present a seat 159. The opposite end of the chamber 155 is formed to present a seat 161. Cooperating with the seat 159 is a valve 163 and cooperating with the seat 161 is a valve 165. These valves are threaded on a rod 167 projecting through the chamber 155 and the bore in the plug 157. Said rod is normally urged outward to open the valve 165 and close the valve 163 by a helical spring 169 confined between one end of a counter-bore in said plug and a nut 171 threaded on said rod. The chamber 155 is connected by a cross port 173 with the duct 45 referred to leading to the pipe 41 connected to the vacuum pump 43.

When the valve 165 is closed it will shut off the vacuum from the duct 153 and pipe 149 and prevent a vacuum condition from existing in the tubes 147. As a result the spring 145 will hold the valve in the exhaust pipe closed. When the valve 165 is in this position the valve 163 is off its seat and there is an admission of atmospheric air in through the plug 157, the chamber 155, duct 153 and pipe 149 to the expansion tubes 147. This permits them to expand and the spring to close the exhaust valve 145.

When the valve 165 is open and the valve 163 is closed the vacuum pump will become effective to create suction through the pipe 41, duct 45, cross port 173, chamber 155, duct 153 and pipe 149 to the expansion tubes 147, thereby collapsing the same and lifting the exhaust valve from its seat and permitting escape of fluid from the vat through the pipe 141.

Figure 5:
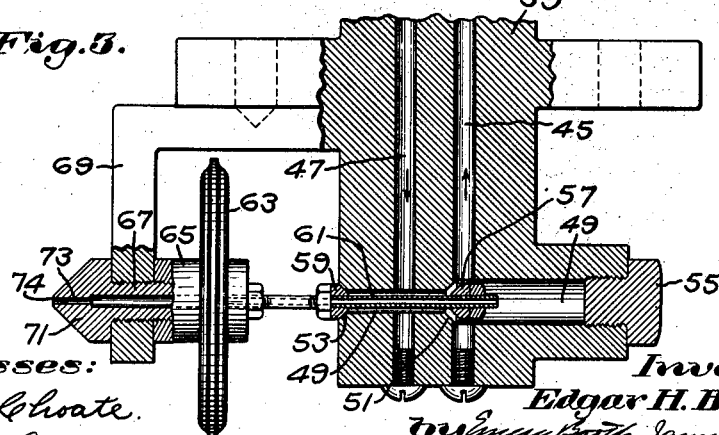
Fig. 5 is a vertical sectional detail taken on line 5—5 of Fig. 2.

Normally the valve 165 should be closed and the valve 163 open, as shown in Fig. 5. To accomplish this a cam 175 (Figs. 2, 6 and 7) is provided fast on the cam shaft 103 referred to and adapted to engage the arm 129 which, as stated, is carried by the standard 127 for the time train starting and stopping shaft described. On the free end of the arm 129 is mounted a U-shaped resilient ribbon-like plate 177 having one end secured to said follower arm by a screw 179 and a free end 181 for engagement with the end of the valve rod 167 which projects somewhat beyond the end of the plug 157.

The cam 175 presents a truly circular arc portion, a shoulder 175ª registering with the shoulder of the cam 101 and a rounded shoulder 175ᵇ. When the cam 101 is set with its follower arm 99 at a point on the cam of smallest radius the cam 175 is in a position with the follower arm 129 resting against a portion of its arc of truly circular form. When in this position the follower arm is pressed toward the valve rod 167 and thrusts the same inward and maintains the valve 165 on its seat, thereby shutting off the exhaust valve tubes from the vacuum pump. The valve 165 will remain closed until the time train has rotated the cam 101 around to a point where its shoulder registers with the end of the follower arm 129. On the occurrence of this event the maximum temperature in the vat has been attained and it is desired to open the exhaust valve and permit a quick drop of the temperature in the vat. This is automatically accomplished on the passing of the shoulder 175ª of the cam past the end of the follower arm 129. This permits said arm to drop toward the axis of the cam shaft away from the valve rod 167, thereby releasing the latter to the action of its spring 169, which operates to shift the rod 167 and open the valve 165 and close the valve 163. This permits vacuum to be placed on the tubes 147, thereby lifting the exhaust valve from its seat and permitting the discharge from the vat.

To make certain that the valve 165 is not opened until after the maximum temperature is attained and the cam follower arm 99 drops from the shoulder of the cam 101, the arm 129 is formed to present an upstanding end with an offset lug 183 adapted to engage a depending end 99$^a$ of the follower 99. In the course of the turning of the cam 101, by virtue of its spiral shape the depending end 99$^a$ of the arm 99 will be gradually moved outward toward and to the lug 183 of said arm 129. This will prevent the rocking of the arm toward the axis of the cam shaft until the depending end 99$^a$ has dropped off the shoulder of the cam 101 toward the axis thereof.

The helix tube will not suddenly contract on the opening of the exhaust valve but its contracting will be gradual. The sudden dropping of the follower arm 99 toward the axis of the cam shaft described will not interfere with the gradual contracting of the helix tube since said arm is not connected with said tube but imparts its movements thereto through the engagement of the pin 97 with the arm 95, the latter being fast on the shaft carrying the tube.

The cam shaft should be rotated in a clockwise direction (Fig. 2). To prevent reverse movement thereof it may be provided with a ratchet wheel 185 and a spring pressed pawl 187 pivotally mounted on the bearing bracket 105 referred to.

To indicate the condition in the pipe 35 leading to the steam inlet valve a pressure gage 189 may be connected thereto; to indicate the condition in the pipe 41 leading from the vacuum pump a pressure gage 191 may be connected thereto and to indicate the condition in the pipe 149 leading to the steam outlet valve a pressure gage 192 may be connected thereto.

The conical valve seat 74 described materially contributes to the effectiveness of the operation of the instrument since it presents a minimum surface for engagement with the valve and permits the movement of the latter to and from the same with a minimum resistance. At the same time it does not permit the accumulation of dirt or foreign matters thereon such as might interfere with the effective closing of the valve. There is a continuous suction through the minute passage in the valve seat excepting at the times when the valve is closed. The air motion thus had tends to prevent the depositing of any dirt or other foreign matter on the seat.

By my invention there is provided a simple, strong and effective mechanism which will automatically, promptly open and close the steam valve with certainty, reliability and precision.

While a steam valve is shown herein as controlled by the apparatus it is to be understood that this is selected merely as an illustrative device to be operated. It will be obvious that the stem might be connected to any other device which it is desired to automatically move for any purpose desired without departing from the spirit and scope of the invention.

While the apparatus described herein is shown as equipped with a vacuum pump, a pressure pump may be used if desired.

The thermometer 77 has been shown as introduced into a vat. This is for purposes of illustration merely since the thermometer may be placed wherever it is desired to maintain a predetermined temperature or varying temperatures.

It is to be understood that while the apparatus is described as controlling both a steam inlet and an exhaust valve it might be employed for controlling merely one of them or other devices without departing from the spirit and scope of the invention.

Having described one illustrative embodiment of the invention without limiting the same thereto, what I claim as new and desire to secure by Letters Patent is:

1. An apparatus of the class described comprising in combination, a valve, a spring tending to close said valve, and means for opening said valve including an expansion tube, a source of abnormal pressures, pipe means connecting said tube and source; and means for controlling the passage of fuel through said pipe means, including a valve seat opening providing communication between said pipe means and the outside atmosphere, a valve seat opening interposed in said pipe means, valves for said openings, an open tube carrying said valves, a chamber for said valves and tube, a diaphragm connected to one end of said tube normally positioned to close said atmosphere valve and open said pipe means valve, a conical valve seat having a minute passage therein communicating with said tube through said diaphragm, a valve for said last named seat, a helical pressure responsive tube carrying said valve, a thermometer and a small gage pipe connecting said thermometer with said helical responsive tube, a sleeve carrying said tube, an arm projecting from said sleeve, a shaft, a cam on said shaft adapted to be engaged by said arm, a hand on said shaft, and a dial graduated and marked to indicate positions of said hand, said hand being adjustable to set said helical tube in positions to present the valve carried thereby at different predetermined distances from said conical valve seat.

2. The combination of a fluid conducting pipe with means to control the passage of fluid therethrough comprising a chamber communicating with said pipe and having a valve for preventing the passage of fluid through said pipe and a valve permitting communication of said pipe with the outside atmosphere, a tube connected to said valves having an open end communicating with said chamber, a diaphragm connected to and communicating with the opposite end of said tube and of an inherent resilience tending to close said atmosphere valve and open the other valve, a conical valve seat having a minute passage therein communicating with said tube through said diaphragm, a valve for said seat, a tubular pressure responsive member carrying said valve, a thermometer and a pipe connecting said member with said thermometer whereby automatically to move said valve to and from its seat.

3. The combination of a fluid conducting pipe with means for controlling the passage of the fluid therethrough comprising a valve permitting communication between said pipe and the outside atmosphere, a valve for closing the passage through said pipe, a chamber communicating with said pipe formed to present seats for said valves, a tube connected to said valves and communicating with said chamber, a diaphragm tending to move said tube in one direction, a valve seat member having a minute passage communicating with said expansion diaphragm and tube, a valve, and pressure responsive means for automatically moving said last named valve toward and from its seat.

4. The combination of a pipe with means for controlling the passage of fluid therethrough comprising valves, one being adapted to permit communication between the outside atmosphere and said pipe and the other being adapted to shut off the passage of fluid through said pipe, means for automatically controlling said valves including a diaphragm having an inherent resilience tending to move said valves in one direction, and means for altering the pressure in said diaphragm to move the same in an opposite direction.

5. The combination of a pipe a chamber communicating with said pipe, valve seats in said chamber and valves controlling the passage of fluid through said pipe, a tube connected to said valves and communicating with said chamber, a diaphragm connected to and communicating with said tube and having provision tending to move the same in one direction, and means cooperating with said tube to render effective pressure conditions in said chamber for varying the pressure in said diaphragm to shift said tube in an opposite direction.

6. The combination of a pipe with means for controlling the passage of fluid therethrough including a valve seat, a valve, pressure responsive governing means for automatically moving said valve toward and from its seat, and means for adjusting said governing means automatically to vary the distance of said valve from its seat.

7. The combination of a pipe with means for controlling the passage of fluid therethrough including a valve seat, a valve therefor, governing means for automatically controlling the movement of said valve with respect to its seat, and means including a time train for automatically varying the distance of said valve from its seat.

8. The combination of a pipe with means for controlling the passage of fluid therethrough including a valve seat, a valve therefor, govering means for automatically moving said valve to and from its seat, and means including a cam, a follower connected to said governing means cooperating with said cam, and a time train for rotating said cam to move said governing means and gradually vary the distance of said valve from its seat.

9. The combination of a pipe with means for controlling the passage of fluid therethrough including a valve seat, a valve, governing means for automatically moving said valve toward and from its seat, a shaft supporting said governing means, a finger propecting from said shaft, a second shaft, a cam thereon for engaging said finger, and means for turning said cam shaft to set said governing means and present said valve at varying distances from its seat.

10. The combination of a pipe with means for controlling the passage of fluid therethrough including a valve seat, a valve, governing means for automatically moving said valve toward and from its seat, a shaft supporting said governing means, a follower connected to said shaft, a second shaft, a cam thereon cooperating with said follower, and means for holding said cam shaft in different predetermined positions of adjustment.

11. The combination of a pipe with means for controlling the passage of fluid therethrough including a valve seat, a valve, governing means for automatically moving said valve toward and from its seat, a shaft supporting said governing means, a follower connected to said shaft, a second shaft, a cam thereon cooperating with said follower, and friction means for holding said cam shaft in different positions of adjustment.

12. The combination of a pipe with means for controlling the passage of fluid therethrough including a valve seat, a valve, governing means for automatically moving said valve toward and from its seat, and means having provision for automatically continuously moving said governing means to vary the distance of said valve from its seat or for setting said governing means to present said valve at different predetermined distances from its seat.

13. The combination of a valve, an expansion tube connected therewith, a source of abnormal pressure, pipe means connecting said tube with said source, valve means in said pipe means, a spring tending to open said valve means, and automatic means for rendering said spring effective to open said valve means when a predetermined condition is attained.

14. The combination of a valve, an expansion tube connected therewith, a source of abnormal pressure, pipe means connecting said tube with said source, valve means for closing said pipe means, and means for automatically opening said valve means including a time train, a cam driven thereby and a follower for said cam cooperating with said valve means.

15. The combination of a valve, an expansion tube connected therewith, a source of abnormal pressure, pipe means connecting said tube with said source, a valve for controlling the communication between said source and tube, a valve for controlling communication of said tube with atmospheric pressure, a rod carrying said valves, a spring tending to shift said rod to open one of said valves and close the other, and means to reverse the movement of said rod.

16. The combination of a valve with a tube connected therewith, a source of abnormal pressure, pipe means connecting said tube with said source, a chamber communicating with said pipe means, a valve for controlling the communication between said source and tube, a valve for controlling communication of said tube with atmospheric pressure, a rod connected to said valve, a spring tending to move said rod in one direction, a cam, and a follower having a yielding device for holding said rod in an opposite direction from said spring.

17. The combination of a valve, a tube connected therewith, a source of abnormal pressure, pipe means connecting said source with said tube, valve means for said pipe means, and means for controlling said valve means including a pressure responsive tube, a time train, a cam driven thereby, and a follower for said cam for positioning said pressure responsive tube.

18. The combination of a valve, a tube connected therewith, a source of abnormal pressure, pipe means connecting said source with said tube, valve means for said pipe means, means for controlling said valve means including a pressure responsive tube, a time train, a cam driven thereby and a follower for said cam connected with said pressure responsive tube, and means for preventing the turning of said cam in one direction.

19. The combination of a valve, a tube connected therewith, a source of abnormal pressure, pipe means connecting said source with said tube, valve means for said pipe means, means for controlling said valve means including a pressure responsive tube, a time train, a cam driven thereby and a follower for said cam connected with said pressure responsive tube, and pawl and ratchet means for preventing the turning of said cam in one direction.

20. The combination of a valve, an expansion tube connected therewith, a source of abnormal pressure, pipe means connecting said tube with said source, valve means for said pipe means, and means for controlling the same including a shaft, a time train for driving said shaft, a cam on said shaft, and means for rendering said time train effective to drive said shaft at will.

21. The combination of a valve, a tube connected therewith, a source of abnormal pressure, pipe means connecting said tube with said source, valve means for controlling the communication between said tube and pump, a shaft, a time train for driving said shaft, a sleeve having a friction fit on said shaft, a cam on said sleeve, a follower, a pressure responsive tube connected with said follower, the valve means being controlled by said pressure responsive tube, means for starting and stopping said time train, and means for setting said cam in different predetermined positions independent of said time train.

22. The combination of a pipe with means for controlling the passage of fluid therethrough including a valve mechanism, a governing valve therefor and means for controlling said valve including an expansible and contractible helical tube, a radial arm connected to said tube to constrict or extend the same on movement thereof and a cam to adjust the arm.

23. The combination of a pipe with means for controlling the passage of fluid therethrough including a valve mechanism, a governing valve therefor and means for controlling said valve including an expansible and contractible helical tube, a radial arm connected to said tube to constrict or extend the same on movement thereof, a cam to adjust the same, a bulb member for exposure to pressure conditions, a pipe connecting said bulb member to said tube, said pipe being formed as a spring and acting to retain said arm in contact with said cam.

24. The combination of a pipe with means for controlling the flow of fluid therethrough, comprising valve means for interrupting the passage through said pipe and placing at least part of said pipe in communication with the atmosphere, said valve means including aligned seats, valves therefor determinately spaced a distance different from that of the seats whereby one is closed while the other is open, a contractible element resiliently tending to retain said valves in one extreme position and means to cause abnormal pressure conditions in said element whereby the same is distorted to move the valves from said position.

25. The combination with a pipe of means for moving fluid therethrough and valve means for controlling the flow of the fluid by interrupting the passage through said pipe and placing at least part of said pipe in communication with the atmosphere, said valve means including seats, valves therefor determinately connected so that one is closed while the other is open, a contractible element resiliently tending to retain said valves in one extreme position, a conduit communicating with said element and having an end exposed to the influence of the fluid-moving means and an end open to the atmosphere and mechanism for automatically closing the communication thereof with the atmosphere whereby to create abnormal pressure conditions in said element to effect the distortion thereof to move the valves from said position.

26. The combination with a pipe of means for moving fluid therethrough and valve means for controlling the flow of the fluid by interrupting the passage through said pipe and placing at least part of said pipe in communication with the atmosphere, said valve means including seats, valves therefor determinately connected so that one is closed while the other is open, a contractible element resiliently tending to retain said valves in one extreme position, a conduit communicating with said element and passing through said valves, having an end exposed to the influence of the fluid-moving means and an end open to the atmosphere and mechanism for automatically closing the communication thereof with the atmosphere whereby to create abnormal pressure conditions in said element to effect the distortion thereof to move the valves from said position.

27. The combination of a chamber, means for supplying a temperature regulating fluid thereto, a fluid pressure controlled main valve for controlling said fluid supply, means for controlling the fluid pressure for the main valve including a valve seat and a valve therefor, means responsive to the temperature in the chamber for moving one of said members with respect to the other, and time controlled means for automatically varying the distance between said members.

28. In a mechanism for controlling the flow of fluid a valve, a device subject to distortion under pressure changes for moving the same and time controlled means for causing a modifying distortion of said device.

29. In a mechanism for controlling the flow of fluid a valve, a device subject to distortion under pressure changes for moving the same and time controlled means for causing a variant modifying distortion of said device throughout a period of time.

30. The combination of a fluid containing member, admission means thereto and discharge means therefrom, an automatic governing mechanism including a valve controlling said admission means, a sensitive device for operating the same, a clock shaft having a cam, a follower for the cam cooperating with said device in controlling the valve, said cam arranged to effect the admission means at the end of a time period, a valve controlling the discharge means, another cam on said shaft for operating the same and motion transmitting means between said other cam and its valve operatively connected to said follower to preclude operation of the discharge means until the end of the time period.

31. An instrument comprising a case having a fitting providing for connection with a source of fluid pressure and with admission and discharge operating means and having passages providing communication of said source with said means respectively, valves for said passages, a clock shaft in the case and cams on said shaft controlling the operation of said valves.

32. An instrument comprising a case having a fitting providing for connection with a source of fluid pressure and with admission and discharge operating means and having passages providing communication of said source with said means respectively, valves for said passages, a pressure sensitive device for governing one of said valves, a clock shaft in the case, a cam on the shaft controlling the tension of said device and a second cam on the shaft governing the other valves.

33. In combination with valve means for controlling the flow of fluid in a pipe, a pressure operated motor for moving the valve means, a helical tube having one end carried on a rotary member, means to admit pressure fluid to the tube, an arm carried by the free end of the tube and arranged to control the operation of said motor means by fluid in the pipe and means for rotatively adjusting said member.

34. In combination with valve means for controlling the flow of fluid in a pipe, a pressure operated motor for moving the valve means, a helical tube having one end carried on a rotary member, means to admit pressure fluid to the tube, an arm carried by the free end of the tube and arranged to control the operation of said motor means by fluid in the pipe and a clock controlled device for rotatively adjusting said member.

35. In combination with valve means for controlling the flow of fluid in a pipe, a pressure operated motor for moving the valve means, a helical tube having one end carried on a rotary member, means to admit pressure fluid to the tube, an arm carried by the free end of the tube and arranged to control the operation of said motor means by fluid in the pipe, an arm on said member, a clock shaft and a cam on said shaft cooperating with said arm rotatively to position said member.

36. Pressure sensitive valve operating means comprising an adjustable rotatably mounted sleeve, a helical tube having one end carried thereby, means to admit pressure to the tube and a valve operating arm carried by the free end of the tube.

In testimony whereof, I have signed my name to this specification, in the presence of two subscribing witnesses.

EDGAR H. BRISTOL.

Witnesses:
HENRY T. WILLIAMS,
EVERETT S. EMORY.